United States Patent
Gillig et al.

[11] 3,813,784
[45] June 4, 1974

[54] GRAPHIC DETERMINATION OF INTERVAL VELOCITY

[75] Inventors: Frederick S. Gillig, Findlay, Ohio; Frank R. Smolka; Lynn D. Trembly, both of Littleton, Colo.

[73] Assignee: Marathon Oil Company, Findlay, Ohio

[22] Filed: Oct. 10, 1972

[21] Appl. No.: 296,488

[52] U.S. Cl. .............. 33/1 HH, 33/1 B, 33/1 C, 33/1 SD
[51] Int. Cl. ............................................ G06g 1/16
[58] Field of Search .......... 33/1 B, 1 C, 1 SD, 1 HH

[56] References Cited
UNITED STATES PATENTS

| 2,747,795 | 5/1956 | Kreuttner | 33/1 B X |
| 2,858,069 | 10/1958 | Garvin | 33/1 HH UX |
| 2,900,724 | 8/1959 | Herbert | 33/1 C |
| 3,124,038 | 3/1964 | Dimond | 33/1 HH X |
| 3,377,707 | 4/1968 | Baeese | 33/1 B X |

Primary Examiner—John W. Huckert
Assistant Examiner—Milton S. Gerstein
Attorney, Agent, or Firm—Joseph C. Herring; Richard C. Willson, Jr.; Jack L. Hummell

[57] ABSTRACT

Velocity in a subterranean interval is determined graphically from Root-Mean-Square (RMS) velocities at the end point of intervals by plotting time vs. velocity squared. A straight line can be drawn through the end points and the intersection of that straight line at $T_1 + T_2$ can be read directly as the velocity of the interval. Alternately, a special template can be used with conventional plotting of time vs. velocity.

3 Claims, 4 Drawing Figures

DIX INTERVAL VELOCITY EQUATION $$V_i = \sqrt{\frac{\bar{V}_2^2 T_2 - \bar{V}_1^2 T_1}{T_2 - T_1}}$$

or $$V_i^2 = \bar{V}_2^2 + T_1 m, \text{ Where } m = \frac{\bar{V}_2^2 - \bar{V}_1^2}{T_2 - T_1}$$

REFLECTION ARRIVAL TIME

GRAPHIC DETERMINATION OF INTERVAL VELOCITY

CROSS REFFERENCES TO RELATED APPLICATIONS

The applicants know of no United States Patent applications which are closely related to the present invention.

BACKGROUND OF THE INVENTION

1. Field of the Invention

The present invention relates to the field of Geometrical Instruments, Miscellaneous generally classified in Class 33, subclass 1(b) and 1(c) of the classification system of the United States Patent Office.

2. Description of the Prior Art

The Dix equation is well-known as being useful for the determination of interval velocity and is described in detail in Dix, C.H., 1955, Seismic Velocities from Surface Measurements: Geophysics, V. 20, p. 68–86.

Various computer programs and manual calculation techniques have utilized the Dix equation and other equations for the determination of the average velocity within a given geological interval, see e.g., Taner, M. T., and Koehler, F., 1969, Velocity Spectra-Digital Computer Derivation and Applications of Velocity Functions: Geophysics, V. 34, p. 859–881.

However, the present invention by permitting rapid graphic determination of average velocity within such intervals, permits the geophysicist to retain the "feel" of the data and to make rapid determinations of whether or not the "picks" of average velocity vs. travel time will yield interval velocities which are reasonable for the area and depth in question and consistent from one velocity analysis location to the next.

SUMMARY OF THE INVENTION

General Statement of the Invention

According to the present invention, the revised form of Dix's equation gives a linear relationship between the square of the interval velocity, $V_i$, between any two points $(T_1, \overline{V}_1)$ and $(T_2, \overline{V}_2)$ on the Root-Mean-Square curve and $T_1$, namely $V_i^2 = \overline{V}_2^2 + T_1 m$, where $m = \overline{V}_2^2 - \overline{V}_1^2 / T_2 - T_1$. In place of the usual scale of velocity, the velocity scale is made linear in $\overline{V}^2$ as shown in FIG. 2a. Reading the intersection on the velocity scale gives $V_i$ directly, since this adds the desired quantity $T_1 m$ to $\overline{V}_2^2$. This method of graphic determination of interval velocity is readily implemented by writing an alternate plotting procedure for the conventional velocity analysis program so as to provide the necessary scale linear in squared velocity. Alternatively, the chart can, of course, be constructed manually.

An alternate method requires an overlay template but permits the use of standard velocity analysis plots. With the template shown in FIG. 1 and FIG. 1a, one merely slides the template over the conventional velocity analysis plot until one curve passes through the two velocity control points at the beginning and end of the interval over which the interval velocity is to be determined. No shift in the velocity direction is allowed since the velocities must align on the overlay template and the velocity analysis plot. Curves with curvatures less than those plotted on the overlay are nearly linear and therefore need not be displayed. The template is made to handle velocity axis scales corresponding to those which are conventionally produced, e.g., 2,000 feet per second per inch of scale. 1. The velocity spectra display, construction, derivation of equation and FIG. 2 of Taner and Koehler Article in Geophysics, Vol. 34, No. 6 (December 1969), P 859–881 refer to C. Hewitt Dix' article entitled "Seismic Velocities from Surface Measurements" in Geophysics, Vol. XX, No. 1 (January, 1955), PP. 68– 86.

DESCRIPTION OF THE PREFERRED EMBODIMENTS

Figure 1:
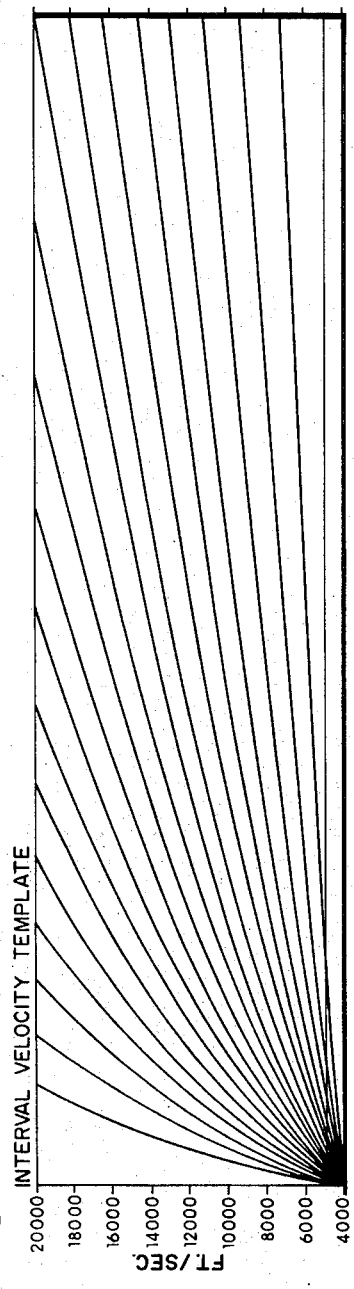
FIG. 1 shows the interval velocity template just as it is imprinted on a transparent base.

The template shown in FIG. 1 is prepared by first constructing a vertical scale of feet per second identical with the scale being used for computer or manual plots of velocity analysis displays. The abcissa (the time axis) need not be marked with units unless desired. This horizontal time axis will be from about 1 to about 2.5, more preferably from about 1.25 to about 2.25, and most preferably from about 1.5 to about 2 times the length of the actual horizontal axis on the velocity analysis displays being utilized in conjunction with the template.

The curves of the template can be constructed either manually or by computer, e.g., using a cal-comp plotting device.

The curves can be constructed as various values of "a" in the following formula:

$$T = V^2 - VL^2/a(VU + VL)$$

VU = upper velocity axis extreme
VL = lower velocity axis extreme
a = an arbitrary positive value which determines the curvature.

Figure 2A:
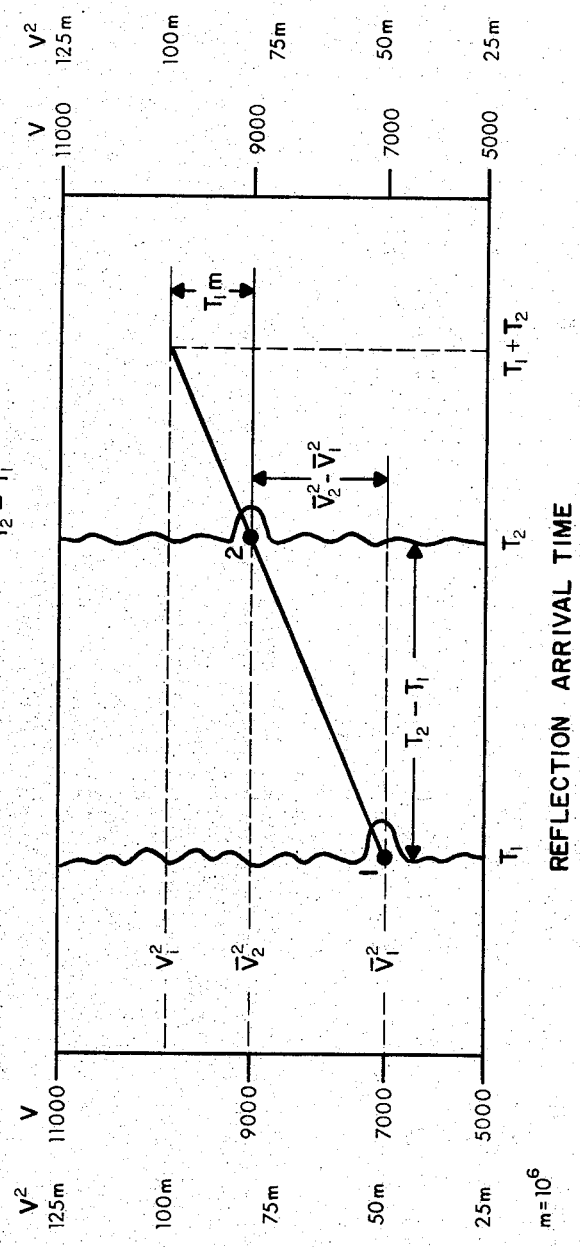
FIG. 2a shows the velocity plot of FIG. 2b with a straight line drawn between the points corresponding to the beginning and end of the geological interval and the extrapolation of the straight line to meet the ordinate $T_1 + T_2$.

The curves of the template correspond to the general equation $V_i = V_2^2 T_2 - V_1^2 T_1 / T_2 - T_1$ or $V_i^2 = \overline{V}_2^2 + T_1 m$, where $m = \overline{V}_2^2 - \overline{V}_1^2/T_2 - T_1$. Referring to FIG. 2a, to find the value of $V_2^2 + T_1 m$ (shown in the second equation of claim 2, (and thus the value of $V_i^2$ which is the desired interval velocity), one utilizes the peculiar geometrical relationship discovered by the inventors. That is, that by measuring off a horizontal distance $T_1$ starting, not at the ordinant, but at point $T_2$, and thereafter drawing a line up some distance until the straight line on the velocity squared plot is intecepted, that distance is equal to $T_1 m$. Thus, the point at which the curve is so intersected has a vertical distance above the abscissa which is equal to $V_2^2 + T_1 m$.

The particular curve used is merely the one which fits through the two points, the set being determined by sliding the template until the proper curve is reached, in a manner analogous to operating a French curve along a series of points until the best "fit" is achieved.

Alternatively, the curves can be constructed graphically by the following procedure. The vertical axis is marked with units of velocity within an interval ranging from the lowest to the highest velocity which is expected to be encountered. This vertical velocity axis is so plotted that the velocity squared values are spaced linearly. Various values of velocity, time pairs are then connected with the extreme lower left-hand corner of the template which is used as a point of origin for a family of straight lines radiating outward at varying slopes. Either manually or by computer, these lines are then warped so that the vertical velocity scale becomes linear in velocity rather than linear in velocity squared, as originally plotted.

The template may be made on any translucent material, e.g., plastic, tracing vellum, photographic film, etc.

The template of FIG. 2 is then used as follows:
1. Lay template on velocity analysis plot so that the template and display velocity axis are in registry with respect to shifts of the template in the velocity direction. By registry it is meant that any straight line of constant velocity V drawn on the velocity analysis plot would also intersect both template velocity axes at this V velocity value. (Note that a template with the proper velocity axis in (ft/sec) per inch must be used.)
2. Slide template along the display time axis (keeping velocity axis in registry) until one of the template parabolic curves passes through both RMS velocity control points (interpolation between parabolic curves may be necessary for increased accuracy).
3. Locate the time on the velocity analysis display corresponding to the sum of the two picked time values $T_1$ and $T_2$, namely $T_1 + T_2$. The ordinate velocity value of the chosen parabolic curve (passing through both control points picks) at the abscissa time value $T_1 + T_2$ is the required average interval velocity.

NOTE:
While most frequently used curves are supplied extrapolation of the furnished template curves may occasionally be required. If the two velocity picks decrease in value with depth (parabolic curves with negative slope required) flip the template end for end and use as before.

EXAMPLE I

Figure 1A:
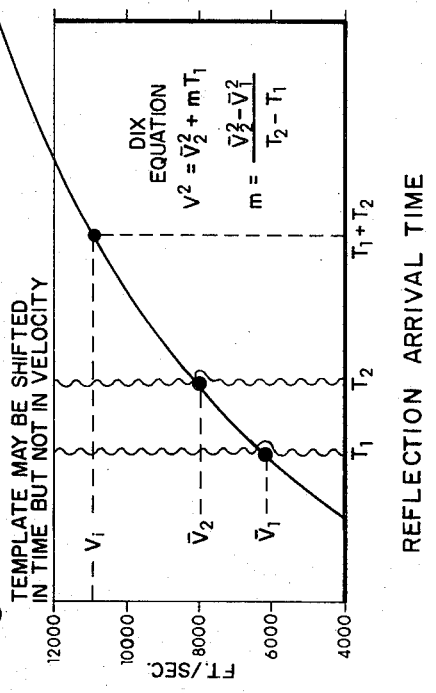
FIG. 1a shows the template (for simplicity only one curve is shown) in use superimposed over a conventional velocity analysis plot having a velocity coordinate with a scale corresponding to that of the template.

Referring to FIG. 1a, a single curve of the interval velocity template of FIG. 1 is shown for simplicity. The curve is aligned with point $\bar{V}_1$ and $\bar{V}_2$ and the intersection of the ordinate $T_1 + T_2$ with the curve is then read directly onto the vertical scale of velocity at point $V_i$. The value thus read directly is the interval velocity of the interval in question, i.e., the interval in which $\bar{V}_1$ and $\bar{V}_2$ are the Root-Mean-Squared end point velocities.

EXAMPLE II

Figure 2B:
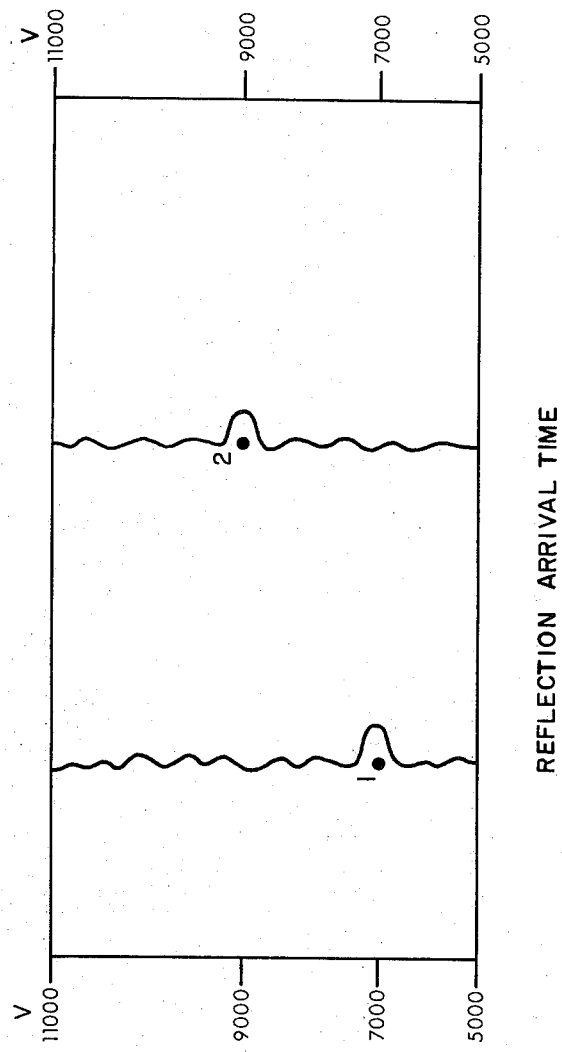
FIG. 2b shows a velocity plot in which the velocity is plotted against time according to the invention. The plot of FIG. 2b is a conventional velocity analysis plot as described at lines 11 and 12 of page 4 of the specification. $T_1$ and $T_2$ are merely the indicated arrival times of two particular seismic events. That is, when a seismic wave is generated by a seismic generator (explosion) it is transmitted through the subterranean surface until it strikes an interface between strata of different physical characteristics. This interface causes a reflection (analogous to optical reflections between interfaces) which is then conveyed back to the surface. The time of arrival of that reflection (as measured from the time of the generation of the shock wave by the explosion) is indicative of the depth and location of the point of reflection.

In place of the template described above, a special velocity analysis plot in which the vertical axis is so distorted that velocity squared values are linearly spaced (rather than linear spacing of velocity markings as in conventional velocity analysis plots) can be constructed. FIG. 2b shows a schematic of such a plot.

After construction, such plots are used by drawing a straight line through the Root-Mean-Squared end points of the velocity at the ends of the interval in question as shown in FIG. 2a. This straight line can then be extended until it meets the ordinate $T_1 + T_2$ and the intersection then projected back to the velocity axis. The point where the projection of the intersection meets the velocity axis, $V_i$ can then be read directly as the interval velocity within the interval in question.

MODIFICATIONS OF THE INVENTION

It should be understood that the invention is capable of a variety of modifications and variations which will be made apparent to those skilled in the art upon a reading of the specification and which are to be included within the spirit of the claims appended hereto.

For example, a sliding vertical runner can be added to the template in order to facilitate the finding of the point of intersection of the appropriate curve with the ordinate $T_1 + T_2$ and this sliding runner can be imprinted with a velocity axis so that the velocity can be read directly over the point of intersection to eliminate the need for projecting onto either of the vertical velocity scales.

The template need not be constructed a full actual size may be projected optically onto the velocity analysis plot. Various mechanical embodiments of the invention, e.g., utilizing lazy-tongs or pantagraphs are possible, based on an understanding of the principles described in the present specification. What is claimed is:

1. In the determination of average velocity of propagation of seismic signals through a given subterranean interval by a process comprising the generation of seismic signals which are reflected from subterranean strata and the measurement of Root-Mean-Square velocities at the end points of said given interval, the improvement comprising in combination the determination of said average velocity by a graphical method comprising:
  a. constructing a plot of time of reflection arrival versus the square of the velocity of said seismic signals,
  b. projecting a straight line through the points on said plot which are respectively representative of the end points of said given interval,
  c. measuring the intersection of said straight line with the coordinate at $T_1 + T_2$,
  d. reading the velocity of propagation corresponding to said intersection, said velocity being the average velocity of propagation within said given interval.

2. In the determination of average velocity of propagation of seismic signals through a given subterranean interval by a process comprising the generation of seismic signals which are reflected from subterranean strata and the measurement of Root-Mean-Square velocities at the end points of said given interval, the improvement comprising:
 a. constructing a plot of time of reflection arrival versus the velocity of said seismic signals,
 b. preparing a template having curves corresponding to the general equation $V_i = \sqrt{\overline{V}_2^2 T_2 - \overline{V}_1^2 T_1/T_2 - T_1}$ or $V_1^2 = V_2^2 + T_1 m$, where $m = \overline{V}_2^2 - \overline{V}_1^2/T_2 - T_1$
 c. shifting said template with respect to time until one of said curves passes through the point representative of the velocity propagation of said seismic signal at the beginning of said interval and also through the second point representative of the velocity of propagation of said seismic signal at the end of said given interval,
 d. reading, as said average velocity, the intersection of said curve with the coordinate representative of the sum of the time of entry of said seismic signal into said given interval and the time of exit of said seismic signal from said given interval.

3. A template for use in the determination of average velocity of seismic signals propagated through a given interval of subterranean formation, said template comprising a substantially transparent base having inscriptions of values of velocity increasing along one axis, values of time increasing along the second axis, and having inscriptions of a family of curves corresponding to various pairs of values of "$a$" in the following equation:
 $T = V^2 - VL^2/a(VU + VL)$
 $VU$ = Upper velocity axis extreme
 $VL$ = Lower velocity axis extreme
 $a$ = an aribitrary positive value which determines the curvature.

* * * * *

UNITED STATES PATENT OFFICE
CERTIFICATE OF CORRECTION

Patent No. 3,813,784　　　　　　　　Dated June 4, 1974

Inventor(s) Frederick S. Gillig et al.

It is certified that error appears in the above-identified patent and that said Letters Patent are hereby corrected as shown below:

Col. 3, line 3:　　　　　　Delete "gemoetrical" and insert therefor --geometrical--.

Col. 3, line 7:　　　　　　Delete "intecepted" and insert therefor --intercepted--.

Col. 3, line 34:　　　　　Delete "Fig. 2" and insert therefor --Fig. 1--.

Col. 4, line 41:　　　　　Delete "size may" and insert therefor --size but may--.

Claim 2, line 12: (formula)　　　Delete "$V_1^2$..." first occurrence, and insert --$V_i^2$...--.

Signed and Sealed this

Thirteenth Day of September 1977

[SEAL]

Attest:

RUTH C. MASON　　　　　　LUTRELLE F. PARKER
Attesting Officer　　　　Acting Commissioner of Patents and Trademarks